United States Patent
Wroe Neild et al.

(10) Patent No.: US 12,485,043 B2
(45) Date of Patent: Dec. 2, 2025

(54) SELECTIVELY CONFIGURABLE WOUND DRESSING

(71) Applicant: ConvaTec Limited, Deeside (GB)

(72) Inventors: Sarah Wroe Neild, Deeside (GB); Natalie Brown, Deeside (GB); Chandan Rangaiah, Deeside (GB); Liam Davies, Deeside (GB); Manjunath Penagondla, Deeside (GB)

(73) Assignee: CONVATEC LIMITED, Flintshire (GB)

( * ) Notice: Subject to any disclaimer, the term of this patent is extended or adjusted under 35 U.S.C. 154(b) by 18 days.

(21) Appl. No.: 17/871,690

(22) Filed: Jul. 22, 2022

(65) Prior Publication Data
US 2023/0022434 A1  Jan. 26, 2023

Related U.S. Application Data

(63) Continuation of application No. PCT/GB2022/051918, filed on Jul. 22, 2022.

(30) Foreign Application Priority Data

Jul. 23, 2021  (GB) .................... 2110652

(51) Int. Cl.
*A61F 13/00*  (2024.01)
*A61F 13/0203*  (2024.01)
(Continued)

(52) U.S. Cl.
CPC .. *A61F 13/00059* (2013.01); *A61F 13/00076* (2013.01); *A61F 13/0206* (2013.01);
(Continued)

(58) Field of Classification Search
CPC .......... A61F 13/00059; A61F 13/00076; A61F 13/0206; A61F 13/0213; A61F 13/05; A61M 1/912
See application file for complete search history.

(56) References Cited

U.S. PATENT DOCUMENTS 11,737,925 B2  8/2023  Haggstrom et al.
11,759,369 B2  9/2023  Buan et al.
(Continued)

FOREIGN PATENT DOCUMENTS

EP  2604299 A1  6/2013
EP  3698817 B1  9/2023
(Continued)

OTHER PUBLICATIONS

Sabreen, Scott, Color Inkjet Printing and Laser Marking for Plastics, Jul./Aug. 2018, www,plasticsdecorating.com (Year: 2018).*
(Continued)

*Primary Examiner* — Jessica Arble
(74) *Attorney, Agent, or Firm* — AFT STETTINIUS HOLLISTER LLP; Ryan O. White; Derek B. Lavender

(57) ABSTRACT

A wound dressing is selectively configurable for use in a pressure gradient wound therapy system and for use without a pressure gradient wound therapy system. The wound dressing can include a pressure distribution layer and a covering layer. The covering layer includes an indicia, the indicia denoting the optimal position in the covering layer to create an aperture to provide fluid communication between the pressure distribution layer and a source of non-atmospheric pressure.

23 Claims, 6 Drawing Sheets

(51) Int. Cl.
*A61F 13/0206* (2024.01)
*A61F 13/05* (2024.01)
*A61M 1/00* (2006.01)

(52) U.S. Cl.
CPC .......... *A61F 13/0213* (2013.01); *A61F 13/05* (2024.01); *A61M 1/912* (2021.05)

(56) References Cited

U.S. PATENT DOCUMENTS

| | | | |
|---|---|---|---|
| 11,759,616 B2 | 9/2023 | Jardret et al. | |
| 11,766,362 B2 | 9/2023 | Mercer et al. | |
| 11,819,602 B2 | 11/2023 | Buan et al. | |
| 11,878,104 B2 | 1/2024 | Kodavanti et al. | |
| 11,896,754 B2 | 2/2024 | Haggstrom et al. | |
| 11,911,556 B2 | 2/2024 | Mercer et al. | |
| 11,950,984 B2 | 4/2024 | Pratt et al. | |
| 11,957,545 B2 | 4/2024 | Hunt et al. | |
| 11,963,850 B2 | 4/2024 | Freedman et al. | |
| 11,964,095 B2 | 4/2024 | Robinson et al. | |
| 11,969,538 B2 | 4/2024 | Quintanar | |
| 11,974,903 B2 | 5/2024 | Brar et al. | |
| 11,975,134 B2 | 5/2024 | Quintanar | |
| 11,992,392 B2 | 5/2024 | Earl et al. | |
| 11,992,601 B2 | 5/2024 | Vess et al. | |
| 11,992,602 B2 | 5/2024 | Quintanar | |
| 12,004,925 B2 | 6/2024 | Hartwell | |
| 12,004,926 B2 | 6/2024 | Long et al. | |
| 12,005,182 B2 | 6/2024 | Askem et al. | |
| 12,016,993 B2 | 6/2024 | Johnson et al. | |
| 2009/0036965 A1* | 2/2009 | Walsh | A61F 2/82 623/1.42 |
| 2009/0048635 A1* | 2/2009 | Andino | A61N 1/0468 607/2 |
| 2010/0106184 A1* | 4/2010 | Coward | A61F 13/01034 606/213 |
| 2011/0282309 A1* | 11/2011 | Adie | A61F 13/022 604/319 |
| 2015/0159066 A1* | 6/2015 | Hartwell | A61F 13/05 604/319 |
| 2015/0258259 A1 | 9/2015 | Johannison | |
| 2016/0120706 A1* | 5/2016 | Collinson | A61M 1/915 604/319 |
| 2017/0151107 A1* | 6/2017 | Ahsani Ghahreman | A61F 13/0203 |
| 2018/0369462 A1* | 12/2018 | Anderson | A61M 1/912 |
| 2020/0000985 A1 | 1/2020 | Seddon et al. | |
| 2020/0023106 A1 | 1/2020 | Carroll et al. | |
| 2020/0100945 A1 | 4/2020 | Albert et al. | |
| 2020/0337906 A1 | 10/2020 | Long et al. | |
| 2021/0145359 A1* | 5/2021 | Hunt | A61B 5/4836 |
| 2021/0205527 A1 | 7/2021 | Pratt et al. | |
| 2023/0218444 A1 | 7/2023 | Wojciechowski et al. | |
| 2023/0248896 A1 | 8/2023 | Simmons et al. | |
| 2023/0285198 A1 | 9/2023 | Locke | |
| 2023/0390116 A1 | 12/2023 | Mercer et al. | |
| 2024/0115792 A1 | 4/2024 | Ingram et al. | |
| 2024/0115797 A1 | 4/2024 | Luckemeyer et al. | |
| 2024/0122763 A1 | 4/2024 | Askem et al. | |
| 2024/0123135 A1 | 4/2024 | Rehbein et al. | |
| 2024/0131249 A1 | 4/2024 | Robinson et al. | |
| 2024/0139035 A1 | 5/2024 | Collinson et al. | |
| 2024/0148560 A1 | 5/2024 | Coulthard et al. | |
| 2024/0156643 A1 | 5/2024 | Allen et al. | |
| 2024/0156645 A1 | 5/2024 | Braga et al. | |
| 2024/0180752 A1 | 6/2024 | Kowanda et al. | |
| 2024/0189492 A1 | 6/2024 | Gowans et al. | |
| 2024/0189500 A1 | 6/2024 | Brearley et al. | |
| 2024/0189501 A1 | 6/2024 | Badran et al. | |
| 2024/0197538 A1 | 6/2024 | Cole et al. | |
| 2024/0207102 A1 | 6/2024 | Allen et al. | |

FOREIGN PATENT DOCUMENTS

| | | |
|---|---|---|
| EP | 3897489 B1 | 11/2023 |
| EP | 4294342 A1 | 12/2023 |
| EP | 3986348 B8 | 2/2024 |
| EP | 4327579 A1 | 2/2024 |
| EP | 3413945 B1 | 4/2024 |
| EP | 3503857 B1 | 4/2024 |
| EP | 3703632 B1 | 4/2024 |
| EP | 4353271 A1 | 4/2024 |
| EP | 3202430 B2 | 5/2024 |
| EP | 3292878 B1 | 5/2024 |
| EP | 3917591 B1 | 5/2024 |
| EP | 4096604 B1 | 5/2024 |
| EP | 4178640 B1 | 5/2024 |
| EP | 4359028 A1 | 5/2024 |
| EP | 3347068 B2 | 6/2024 |
| EP | 3470030 B1 | 6/2024 |
| EP | 3917471 B1 | 6/2024 |
| GB | 2596948 B | 9/2023 |
| GB | 2611914 B | 9/2023 |
| GB | 2605037 B | 3/2024 |
| GB | 2623680 A | 4/2024 |
| GB | 2606958 B | 5/2024 |
| GB | 2606959 B | 6/2024 |
| WO | 2020051548 A1 | 3/2020 |
| WO | 2020146154 A2 | 7/2020 |

OTHER PUBLICATIONS

UKIPO Search Report of corresponding application GB2110652.1; Date: Apr. 28, 2022; pp. 2.

* cited by examiner

SELECTIVELY CONFIGURABLE WOUND DRESSING

CROSS REFERENCE TO RELATED DISCLOSURES

The present disclosure is a continuation of International Application No. PCT/GB2022/051918 filed on Jul. 22, 2022 and claims the benefit if GB2110652.1 filed on Jul. 23, 2021, the contents of which are incorporated herein in entirety.

TECHNICAL FIELD OF THE INVENTION

The present invention relates to a wound dressing and kit comprising such a wound dressing, and in particular to a wound dressing selectively configurable for use in a pressure gradient wound therapy apparatus or for use without a pressure gradient wound therapy apparatus.

BACKGROUND TO THE INVENTION

Health care professionals (HCPs) are required to evaluate and treat a variety of wounds with different requirements which can change as treatment progresses. Accordingly, HCPs keep stocks of different types of dressings for different requirements.

Pressure gradient wound therapy (positive or negative) is one known way of treating various wound types. Typically, this involves applying a pressure differential between a sealed region of a wound dressing and the surrounding environment to assist with healing the wound, e.g. through removal of oedema, increasing blood flow, mechanical contraction of the wound, increasing formation of granulation tissue and/or active removal of excess exudate from the wound. Wound therapy of this type is particularly effective for the treatment of open traumatic, non-traumatic and chronic wounds.

Amongst different types of dressings are those designed and intended for use as an advanced wound dressing to manage exudate and protect the wound. These can, for example, have a wound contact layer including gelling fibres, such as the Hydrofiber® technology included in Aquacel® surgical dressings available from ConvaTec Ltd of Deeside, UK, which transform into a gel on contact with wound fluid. (Such wound dressings are not intended for use with pressure gradient wound therapy, nor used for such applications in practice, owing to their construction.)

Other types of wound dressing are specially adapted to be used in conjunction with a pressure gradient wound therapy apparatus, e.g. with a negative pressure wound therapy (NPWT pump). In their original incarnation, NWPT systems had large, heavy (not portable/wearable) pump arrangements connected via tubing to the wound; at the wound, a reticulated open cell foam dressing is introduced into the wound and a separate adhesive drape is placed over the top. To connect the tubing to the wound in these large systems, a health care professional pinches the drape and foam beneath, and snips a hole through both drape and foam to form an aperture in the top for connection to the tubing. These systems and the two-part wound dressing (i.e. separate foam and drape) are still widely used in hospitals where professional staff are on-hand to set up to systems.

More recently, and especially in portable or wearable pressure gradient wound therapy systems intended for home-use, one-piece dressings have been introduced, in which an adhesive covering layer and dressing are integrated. An example of such a dressing is the Avelle® dressing available from ConvaTec Limited of Deeside UK. That dressing has a covering film layer with an adhesive border provided around its periphery to form a seal around the wound and a wound contact layer of stitch-bonded Hydrofiber® material. A foam pressure-distribution layer is provided between the covering layer and the wound contact layer (adjacent the covering layer) and additional layers of fenestrated Hydrofiber® layers are provided between the wound contact layer and the pressure-distribution layer. The covering layer is provided with an aperture, to allow connection of tubing from the negative pressure source and in this example, the dressing includes an "airway" extending from the aperture to a connector for connection to tubing through which negative pressure is provided.

Naturally, where a hospital or the like provides both "normal" wound dressings and those for use with pressure gradient wound therapy it needs to keep stocks of both, in various different sizes, which requires space, and lends complexity to the stock-ordering and stock selection process.

The present inventors have identified that it would be beneficial to be able to provide a dressing that could be used for both pressure gradient wound therapy and "normal" treatment of wounds without a pressure gradient, in order that such treatment could be applied as and when required, and if no longer required, the dressings could still be used.

It is an aim of an embodiment or embodiments of the invention to overcome or at least partially mitigate one or more problems with the prior art and/or to provide an improved wound dressing.

SUMMARY OF THE INVENTION

According to a broad aspect of the invention there is provided a wound dressing selectively configurable for use in a pressure gradient wound therapy system and for use without a pressure gradient wound therapy system.

The wound dressing may comprise a covering layer; the wound dressing may comprise a pressure distribution layer; the covering layer may define a cavity; the pressure distribution layer may be provided in, e.g. contained in, the cavity; the wound dressing may comprise an indicia; the indicia may be visible on an outside surface of the covering layer; the covering layer may comprise the indicia; the indicia may denote a position (for example a suitable position or the optimal position) in the covering layer to create an aperture to provide fluid communication between the pressure distribution layer and a source of non-atmospheric pressure.

According to an aspect of the invention there is provided a wound dressing selectively configurable for use in a pressure gradient wound therapy system and for use without a pressure gradient wound therapy system; the wound dressing comprising a pressure distribution layer and a covering layer; wherein the wound dressing comprises an indicia, the indicia being visible on an outside surface of the covering layer the indicia denoting the optimal position in the covering layer to create an aperture to provide fluid communication between the pressure distribution layer and a source of non-atmospheric pressure.

Advantageously such a wound dressing can be used either with a pressure gradient wound therapy system, or without. Thus, stock-keeping is simplified. Moreover, if, during "normal" treatment without pressure gradient it is determined that it would be beneficial for pressure gradient wound therapy to be used, such a system could be added, by configuring the wound dressing accordingly (i.e. cutting an aperture as denoted by the indicia) and attaching a source of non-atmospheric pressure (e.g. tubing from a NWPT pump). Notably, this could be done without the need for an additional dressing change, thus reducing the risk of wound infection. Similarly, if a wound is being treated with a pressure gradient, e.g. NWPT and the amount of exudate produced is reduced, so that NWPT is no longer required, a patient would be able to use up the stock of dressings without the NWPT system, by configuring them for use without the system (i.e. by not cutting an aperture in the covering layer).

When used herein and throughout the specification the term "pressure gradient wound therapy apparatus" is intended to cover a wound therapy apparatus wherein a pressure differential (either positive or negative) is applied between a sealed region of the wound dressing and the surrounding environment.

As used herein, negative pressure wound therapy is a therapeutic technique using a suction dressing to remove excess exudation and promote healing in acute or chronic wounds. A vacuum of −50 to −200 mm Hg, or −75 to −150 mm Hg may be applied with typical negative pressure of −80 to −130 mm Hg, −100 to −130 mm Hg, or often about −125 mm Hg being applied to a wound.

For positive pressure wound therapy, a net positive pressure is applied to the wound, which may include providing simultaneous aspiration and irrigation of the wound. Positive pressure wound therapy may be carried out at a positive pressure of up to 50% atm., typically at a low positive pressure of up to 20% atm., more usually up to 10% atm. at the wound. Positive pressure wound therapy is known and referred to in US20180140755.

Optional features set out below may apply to any aspect of the invention.

The indicia may be a mark. The mark may be formed of ink or dye, for example the indicia may be printed. The mark may be formed by discoloration, e.g. the indicia could be laser marked. The covering layer may comprise the indicia. The indicia may be printed onto the covering layer. Alternatively the indicia could be applied by other means. The covering layer may have an upper side and an underside. The indicia may be applied onto the upper side of the covering layer. The indicia may be applied onto the underside of the covering layer. The covering layer may be transparent or translucent (this would allow indicia to be visible even if printed onto the underside). The covering layer may be a laminate. If the covering layer is a laminate, the indicia may be applied to the upper layer of the laminate (underside or upper side), or to an intermediate or bottom layer of the laminate, provided it is visible on the outside (upper) surface of the covering layer. Where the covering layer is transparent, the indicia could even be applied to a layer beneath the covering layer, provided, of course, that it is visible on the outside of the covering layer.

The indicia is preferably located out of alignment (i.e. vertical alignment in use) with the centre of the dressing. For example it may be located towards the periphery of the covering layer and/or the pressure distribution layer (or the wound when in use). This assists in the spread of exudate across the full extent of the pressure distribution layer (and across an absorbent layer where an absorbent layer is provided).

The pressure distribution layer may be provided adjacent to the cover layer. The covering layer may define a cavity. The pressure distribution layer may be provided in, e.g. contained in, the cavity. The pressure distribution layer may be gas and liquid permeable and particularly moisture vapour permeable. The pressure distribution layer serves to aid access of exudate to a greater area of the absorbent layer by allowing it to spread under the distribution layer. The pressure distribution layer also serves to even out the negative pressure applied to the wound over the whole dressing (when used for NWPT). The pressure distribution layer is preferably configured to distribute exudate and negative pressure over the dressing. The pressure distribution layer preferably has an open structure when under negative pressure. The layer preferably wicks fluid but has low fluid absorption properties so that the open spaces do not become blocked with exudate as this can prevent air and fluid flow through the dressing. The pressure distribution layer is preferably a foam layer such as a polyester foam of the type XD4200AS manufactured by Caligen or another suitable reticulated foam, such as a hydrophilic non-swelling reticulated foam, e.g. the SAQ series manufactured by INOAC, or hydrophobic reticulated polyester polyurethane foam, e.g. that sold under the designation S90M from INOAC. Alternatively, the pressure distribution layer could be a 3D spacer fabric, or a knitted or mesh fabric.

An adhesive layer may be provided so as to form an adhesive border. The adhesive layer may be provided on the underside of the covering layer. The adhesive border may be provided at the periphery of the dressing arranged to adhere the dressing to the skin surrounding the wound to form a fluid tight seal. The adhesive layer may be provided with perforations to assist transport of exudate and fluid through the dressing. The adhesive layer may also be applied to any of the other layers to provide an island configuration.

The indicia may be located in a region of the covering layer within that defined by the adhesive border. For example it may be located towards the periphery of the region of the covering layer inwards of the adhesive border.

In the configuration for use without a pressure gradient wound therapy system the region of the covering layer within that defined by the adhesive border may be closed, sealed and/or uninterrupted, e.g. a continuous unbroken membrane. This restricts/prevents microbes, bacteria or the like from entering the wound dressing and hence from entering the wound. In the configuration for use with a pressure gradient wound therapy system the region of the covering layer within the adhesive border may be interrupted by an opening, the opening being an aperture in the region of the indicia for connection to a source of non-atmospheric pressure. This allows non-atmospheric pressure to be applied to the wound.

The wound dressing may include a dressing body comprising an absorbent material for contacting the wound, i.e. which may be positioned in contact with a wound, in use. The dressing body may be formed from one of more layers. The dressing body may be configured to absorb exudate from the wound, aided by the action of a connected pump assembly. The dressing body may comprise an absorbent foam material, for example a layer of absorbent foam material. The foam material may comprise a superabsorbent material, for example a superabsorbent foam material. The dressing body may be formed of a hydrocolloid material which may gel in the presence of an exudate. The hydrocolloid material may comprise a layer or multiple layers of gelling fibres and absorbent materials. The covering layer may be constructed of a thin film layer (e.g. a polyurethane) enabling moisture vapour to exit the dressing at an increased rate. This combination is particularly suitable for allowing the wound therapy apparatus to manage fluid without the need of a canister. This may be referred to as a "canisterless" or "canister-free" system. In a variant, the wound dressing may be operable to be fluidly connected to a canister into which exudate removed from the wound may be withdrawn. The adhesive border may define an interior region of the wound dressing. The dressing body may be provided in the interior region of the wound dressing.

The wound dressing may comprise a release layer, the release layer being removable to reveal the adhesive border.

The wound dressing may have a thickness between 1 mm to 20 mm, or 2 mm to 10 mm, or 3 mm to 7 mm, for example.

The pressure distribution layer may be a foam layer. The wound dressing may comprise the outer cover layer, the pressure distribution layer, one or more absorbent layer(s) and a silicone gel wound contact layer. The wound dressing may comprise an outer cover layer and one or more absorbent layer(s) in combination with a gel-forming fibre. The gel-forming fibre typically is in direct contact with the wound, and thus no additional wound contact layer is required i.e., a silicone gel wound contact layer does not require a silicone gel layer.

Gel-forming fibres include hygroscopic fibres which upon the uptake of wound exudate become moist slippery or gelatinous. The gel forming fibres can be of the type which retain their structural integrity on absorption of exudate or can be of the type which lose their fibrous form and become an amorphous or structureless gel. The gel forming fibres are preferably sodium carboxymethylcellulose fibres, chemically modified cellulosic fibres, alkyl sulphonate modified cellulosic fibres such as those described in WO2012/061225, pectin fibres, alginate fibres, chitosan fibres, hyaluronic acid fibres, or other polysaccharide fibres or fibres derived from gums. The cellulosic fibres preferably have a degree of substitution of at least 0.05 carboxymethyl groups per glucose unit. The gel forming fibres preferably have an absorbency of at least 2 grams 0.9% saline solution per gram of fibre (as measured by the free swell method).

The gel forming fibres are preferably chemically modified cellulosic fibres in the form of a fabric and in particular carboxymethylated cellulose fibres as described in PCT WO00/01425 to Azko Nobel UK Ltd, and can be provided by a layer of gel forming fibres preferably located in a port of the cover layer or as a layer of fibres in a conduit of the wound dressing. When present in the conduit, the layer of fibres can also serve to keep the conduit open to the passage of fluid in the event that the conduit is kinked or otherwise restricted by being lain on or leaned on by the user. The carboxymethylated cellulosic fabrics preferably have a degree of substitution between 0.12 to 0.35 as measured by IR spectroscopy (as defined in WO00/01425) more preferably a degree of substitution of between 0.20 and 0.30 and are made by carboxymethylating a woven or non-woven cellulosic fabric such that the absorbency is increased. Particular preferred fabrics have an absorbency of between 10 g/g of sodium/calcium chloride as defined above to 30 g/g of sodium/calcium chloride as measured by the method described in BS EN 13726-1 (2002) "Test methods for primary wound dressings", section 3.2 "Free swell absorptive capacity". Particularly preferred fabrics have an absorbency of 15 g/g to 25 g/g and most preferred of 15 g/g to 20 g/g of sodium/calcium chloride as measured by the method defined above.

The cellulosic fabric preferably consists solely of cellulosic fibre but may contain a proportion of non-cellulosic textile fibre or gel forming fibre. The cellulosic fibre is of known kind and may comprise continuous filament yarn and/or staple fibre. The carboxymethylation is generally performed by contacting the fabric with an alkali and a carboxymethylating agent such a chloracetic acid in an aqueous system. The fabric is preferably of a non-woven type to reduce shedding in the wound on cutting the dressing. Preferably the fabric is hydroentangled and thus comprises a series of apertures on a microscopic scale.

Where present, the absorbent layer of the wound dressing is capable of absorbing exudate from the wound and allowing the passage of fluid through it. The absorbent layer can comprise any absorbent capable of absorbing exudate while allowing the passage of fluid through it, such as a foam, sponge or fibre-based material, preferably the absorbent layer is provided by gel forming fibres of the same type or of a different type as those discussed above. The gel-forming fibres are hygroscopic fibres which upon the uptake of wound exudate become moist slippery or gelatinous and thus reduce the tendency for the surrounding fibres to adhere to the wound. The gel forming fibres are preferably spun sodium carboxymethylcellulose fibres, chemically modified cellulosic fibres, alkyl sulphonate modified cellulosic fibres such as those described in WO2012/061225, pectin fibres, alginate fibres, chitosan fibres, hyaluronic acid fibres, or other polysaccharide fibres or fibres derived from gums. The cellulosic fibres preferably have a degree of substitution of at least 0.05 carboxymethyl groups per glucose unit and more preferably are lightly substituted so that the absorbency of the fibres is limited. The gel forming fibres preferably have an absorbency of at least 2 grams 0.9% saline solution per gram of fibre (as measured by the method described above) but less than 30 grams 0.9% saline solution per gram of fibre. The gel forming fibres are preferably carboxymethylated cellulose fibres as described in PCT WO00/01425 to Azko Nobel UK Ltd which describes lightly carboxymethylated cellulose fabrics. The gel forming fibres are preferably lightly carboxymethylated in order to reduce the tendency of the absorbent layer to gel block and block the pathway for fluid from the wound, e.g. through the absorbent layer, the port and to a distal end of the conduit.

Preferably an absorbent layer is provided with fenestrations to aid the application of negative pressure to the wound and maintain the pathway for fluid from the wound, through the absorbent layer. Typically, however, fenestrations are only provided in internal absorbent layers.

Although the absorbent layer can be in direct contact with the wound, preferably the dressing comprises a wound contact layer, positioned between the wound and the absorbent layer(s). The wound contact layer may be capable of absorbing exudate from the wound and transmitting it to the absorbent layer. Thus, there may be provided "internal" absorbent layers as defined above, preferably including fenestrations and an external absorbent layer, which forms the wound contact layer. Like the internal absorbent layer, the wound contact layer may be capable of allowing the passage of fluid through it so that pressure (either positive or negative) may applied to the wound and the pathway for fluid/exudate from the wound to the distal end of the conduit may be maintained.

The wound contact layer may include gel-forming fibres (e.g. of the type discussed herein), or a silicone gel, for example.

Preferably the wound contact layer comprises gel-forming fibres. The gel-forming fibres may be the same or a similar type to those comprising the absorbent layer but the wound contact layer may be strengthened to increase its integrity and that of the dressing. For example, the wound contact layer may be of the type described in EP 1904011 and comprise gel-forming fibres in the form of a mat with lines of longitudinal stitching made of cellulose or nylon or polyolefin yarn to increase the integrity of the layer. Preferably the wound contact layer is porous to maintain the pathway for fluid/exudate from the wound to the distal end of the conduit.

Preferably the one or more absorbent layer(s) comprise an internal absorbent layer provided with fenestrations to aid the application of negative pressure to the wound and maintain the pathway for fluid from the wound, through the internal absorbent layer and a wound contact layer comprising gel-forming fibres is also provided.

The (outer) covering layer of the dressing is provided as a bacterial and viral barrier layer which preferably resists the ingress of liquid and air but allows moisture vapour transmission. In this way the covering layer enhances the overall fluid handling capacity of the dressing by allowing for the escape of moisture vapour through the cover while enabling the application of pressure (either positive or negative) to the wound.

The outer covering layer is for instance a layer having a MVTR of at least 10,000 g m$^{-2}$ per 24 hours or in the range of from 10,000 gm$^{-2}$ to 50,000 g m$^{-2}$ per 24 hours measured by the method described in BS EN 13726-2 2002 "Test methods for primary wound dressings Part 2 Moisture vapour transmission rate of permeable film dressings". The covering layer may be in the form of a film of polyurethane, for example Epurex 912 T/129 manufactured by Covestro or Inspire 2350 manufactured by Coveris or Medifilm 426 manufactured by Mylan. Alternatively, the covering layer may be in the form of a film of polyethylene.

The wound dressing preferably is a one-piece dressing. That is to say, the covering layer and the body of the wound dressing are provided as an integral item, preferably including an adhesive layer and preferably including a removable release layer. The body of the wound dressing that is provided, along with the covering layer, as an integral item may comprise the pressure distribution layer.

The one-piece dressing may be provided in a package. The package may be a sterile package.

According to another broad aspect of the invention, there is provided a kit of parts including a selectively configurable wound dressing, the wound dressing being configurable for use in a pressure gradient wound therapy system and without a pressure gradient wound therapy system; the kit further comprising at least one of: (a) packaging indicating that the wound dressing is selectively configurable for use in a pressure gradient wound therapy system and without a pressure gradient wound therapy system; (b) instructions instructing a user as to how to configure the wound dressing for use in a pressure gradient wound therapy system and for use without a pressure gradient wound therapy system; (c) a piercing tool configured to pierce a covering layer of the wound dressing to produce an aperture therein and thereby configure the wound dressing for use in a pressure gradient wound therapy system; (d) a source of non-atmospheric pressure; (e) a port for connection to the covering layer of the wound dressing to connect the wound dressing to a source of non-atmospheric pressure; or (f) tubing for connection between a wound dressing and a source of non-atmospheric pressure.

The wound dressing may comprise a wound contact layer and a covering layer, the covering layer having a first surface facing the wound contact layer and defining a wound dressing cavity, and a second surface; wherein an indicia is visible on the second surface of the covering layer, the indicia denoting a suitable, or more preferably an optimal, position in the covering layer to create an aperture to provide fluid communication between the wound dressing cavity and a source of non-atmospheric pressure.

According to another aspect of the invention, there is provided a kit of parts including a selectively configurable wound dressing, the wound dressing being configurable for use in a pressure gradient wound therapy system and without a pressure gradient wound therapy system; the kit further comprising at least one of: (a) packaging indicating that the wound dressing is selectively configurable for use in a pressure gradient wound therapy system and without a pressure gradient wound therapy system; (b) instructions instructing a user as to how to configure the wound dressing for use in a pressure gradient wound therapy system and for use without a pressure gradient wound therapy system; (c) a piercing tool configured to pierce a covering layer of the wound dressing to produce an aperture therein and thereby configure the wound dressing for use in a pressure gradient wound therapy system; (d) a source of non-atmospheric pressure; (e) a port for connection to the covering layer of the wound dressing to connect the wound dressing to a source of non-atmospheric pressure; or (f) tubing for connection between a wound dressing and a source of non-atmospheric pressure; wherein the wound dressing comprises a wound contact layer and a covering layer, the covering layer having a first surface facing the wound contact layer and defining a wound dressing cavity, and a second surface; wherein an indicia is visible on the second surface of the covering layer, the indicia denoting a suitable position (preferably an optimal position) in the covering layer to create an aperture to provide fluid communication between the wound dressing cavity and a source of non-atmospheric pressure.

As noted above, the optional features set out above are equally applicable to all aspects (or embodiments) of the invention. For example, the selectively configurable wound dressing of the aspects of the invention concerning kit may be the selectively configurable wound dressing of either of the aspects outlined above including any of the optional features set out.

In one embodiment there is provided a kit of parts including a selectively configurable wound dressing, the wound dressing being configurable for use in a pressure gradient wound therapy system and without a pressure gradient wound therapy system; the kit further comprising: (a) packaging indicating that the wound dressing is selectively configurable for use in a pressure gradient wound therapy system and without a pressure gradient wound therapy system; wherein the wound dressing comprises a wound contact layer and a covering layer, the covering layer having a first surface facing the wound contact layer and defining a wound dressing cavity, and a second surface; wherein an indicia is visible on the second surface of the covering layer, the indicia denoting a suitable position (preferably an optimal position) in the covering layer to create an aperture to provide fluid communication between the wound dressing cavity and a source of non-atmospheric pressure.

In another embodiment there is provided a kit of parts including a selectively configurable wound dressing, the wound dressing being configurable for use in a pressure gradient wound therapy system and without a pressure gradient wound therapy system; the kit further comprising: (b) instructions instructing a user as to how to configure the wound dressing for use in a pressure gradient wound therapy system and for use without a pressure gradient wound therapy system; wherein the wound dressing comprises a wound contact layer and a covering layer, the covering layer having a first surface facing the wound contact layer and defining a wound dressing cavity, and a second surface; wherein an indicia is visible on the second surface of the covering layer, the indicia denoting a suitable position (preferably an optimal position) in the covering layer to create an aperture to provide fluid communication between the wound dressing cavity and a source of non-atmospheric pressure.

In another embodiment there is provided a kit of parts including a selectively configurable wound dressing, the wound dressing being configurable for use in a pressure gradient wound therapy system and without a pressure gradient wound therapy system; the kit further comprising: (c) a piercing tool configured to pierce a covering layer of the wound dressing to produce an aperture therein and thereby configure the wound dressing for use in a pressure gradient wound therapy system; wherein the wound dressing comprises a wound contact layer and a covering layer, the covering layer having a first surface facing the wound contact layer and defining a wound dressing cavity, and a second surface; wherein an indicia is visible on the second surface of the covering layer, the indicia denoting a suitable position (preferably an optimal position) in the covering layer to create an aperture to provide fluid communication between the wound dressing cavity and a source of non-atmospheric pressure.

In another embodiment, there is provided a kit of parts including a selectively configurable wound dressing, the wound dressing being configurable for use in a pressure gradient wound therapy system and without a pressure gradient wound therapy system; the kit further comprising: (d) a source of non-atmospheric pressure; wherein the wound dressing comprises a wound contact layer and a covering layer, the covering layer having a first surface facing the wound contact layer and defining a wound dressing cavity, and a second surface; wherein an indicia is visible on the second surface of the covering layer, the indicia denoting a suitable position (preferably an optimal position) in the covering layer to create an aperture to provide fluid communication between the wound dressing cavity and a source of non-atmospheric pressure.

In another embodiment, there is provided a kit of parts including a selectively configurable wound dressing, the wound dressing being configurable for use in a pressure gradient wound therapy system and without a pressure gradient wound therapy system; the kit further comprising: (e) a port for connection to the covering layer of the wound dressing to connect the wound dressing to a source of non-atmospheric pressure; wherein the wound dressing comprises a wound contact layer and a covering layer, the covering layer having a first surface facing the wound contact layer and defining a wound dressing cavity, and a second surface; wherein an indicia is visible on the second surface of the covering layer, the indicia denoting a suitable position (preferably an optimal position) in the covering layer to create an aperture to provide fluid communication between the wound dressing cavity and a source of non-atmospheric pressure.

In another embodiment, there is provided a kit of parts including a selectively configurable wound dressing, the wound dressing being configurable for use in a pressure gradient wound therapy system and without a pressure gradient wound therapy system; the kit further comprising: (f) tubing for connection between a wound dressing and a source of non-atmospheric pressure; wherein the wound dressing comprises a wound contact layer and a covering layer, the covering layer having a first surface facing the wound contact layer and defining a wound dressing cavity, and a second surface; wherein an indicia is visible on the second surface of the covering layer, the indicia denoting a suitable position (preferably an optimal position) in the covering layer to create an aperture to provide fluid communication between the wound dressing cavity and a source of non-atmospheric pressure.

Of course the kit may comprise various combinations of features a to f; for example the kit may comprise at least two features including a+b; the kit may comprise at least two features including a+c; the kit may comprise at least two features including a+d; the kit may comprise at least two features including a+e; the kit may comprise at least two features including a+f; the kit may comprise at least two features including b+c; the kit may comprise at least two features including b+d; the kit may comprise at least two features including b+e; the kit may comprise at least two features including b+f; the kit may comprise at least two features including c+d; the kit may comprise at least two features including c+e; the kit may comprise at least two features including c+f; the kit may comprise at least two features including d+e; the kit may comprise at least two features including d+f; or the kit may comprise at least two features including or e+f The kit may comprise at least three features including a+b+c; the kit may comprise at least three features including a+b+d; the kit may comprise at least three features including a+b+e; the kit may comprise at least three features including a+b+f; the kit may comprise at least three features including a+c+d; the kit may comprise at least three features including a+c+e; the kit may comprise at least three features including a+c+f; the kit may comprise at least three features including a+d+e; the kit may comprise at least three features including a+d+f; the kit may comprise at least three features including a+e+f; the kit may comprise at least three features including b+c+d; the kit may comprise at least three features including b+c+e; the kit may comprise at least three features including b+c+f; the kit may comprise at least three features including b+d+e; the kit may comprise at least three features including b+d+f; the kit may comprise at least three features including b+e+f; the kit may comprise at least three features including c+d+e; the kit may comprise at least three features including c+d+f; the kit may comprise at least three features including c+e+f; or the kit may comprise at least three features including d+e+f. The kit may comprise at least four features including a+b+c+d; the kit may comprise at least four features including a+b+c+e; the kit may comprise at least four features including a+b+c+f; the kit may comprise at least four features including b+c+d+e; the kit may comprise at least four features including b+c+d+f; the kit may comprise at least four features including b+d+e+f; or the kit may comprise at least four features including c+d+e+f. The kit may comprise at least five features including a+b+c+d+e; the kit may comprise at least five features including a+b+c+d+f; the kit may comprise at least five features including a+b+c+e+f; the kit may comprise at least five features including a+b+d+e+f; the kit may comprise at least five features including a+c+d+e+f; or the kit may comprise at least five features including b+c+d+e+f. The kit may comprise all six features; a+b+c+d+e+f.

One particular embodiment includes at least one item selected from a+b; one particular embodiment includes at least one item selected from a+c; one particular embodiment includes at least one item selected from a+d; one particular embodiment includes at least one item selected from a+e; one particular embodiment includes at least one item selected from a+f; one particular embodiment includes at least one item selected from b+c; one particular embodiment includes at least one item selected from b+d; one particular embodiment includes at least one item selected from b+e; one particular embodiment includes at least one item selected from b+f; one particular embodiment includes at least one item selected from c+d; one particular embodiment includes at least one item selected from c+e; one particular embodiment includes at least one item selected from c+f; one particular embodiment includes at least one item selected from d+e; one particular embodiment includes at least one item selected from d+f; one particular embodiment includes at least one item selected from e+f; one particular embodiment includes at least one item selected from a+b+c; one particular embodiment includes at least one item selected from a+b+d; one particular embodiment includes at least one item selected from a+b+e; one particular embodiment includes at least one item selected from a+b+f; one particular embodiment includes at least one item selected from a+c+d; one particular embodiment includes at least one item selected from a+c+e; one particular embodiment includes at least one item selected from a+c+f; one particular embodiment includes at least one item selected from a+d+e; one particular embodiment includes at least one item selected from a+d+f; one particular embodiment includes at least one item selected from a+e+f; one particular embodiment includes at least one item selected from b+c+d; one particular embodiment includes at least one item selected from b+c+e; one particular embodiment includes at least one item selected from b+c+f; one particular embodiment includes at least one item selected from b+d+e; one particular embodiment includes at least one item selected from b+d+f; one particular embodiment includes at least one item selected from b+e+f; one particular embodiment includes at least one item selected from c+d+e; one particular embodiment includes at least one item selected from c+d+f; one particular embodiment includes at least one item selected from c+e+f; one particular embodiment includes at least one item selected from d+e+f; one particular embodiment includes at least one item selected from a+b+c+d; one particular embodiment includes at least one item selected from a+b+c+e; one particular embodiment includes at least one item selected from a+b+c+f; one particular embodiment includes at least one item selected from b+c+d+e; one particular embodiment includes at least one item selected from b+c+d+f; one particular embodiment includes at least one item selected from b+d+e+f; one particular embodiment includes at least one item selected from c+d+e+f; one particular embodiment includes at least one item selected from a+b+c+d+e; one particular embodiment includes at least one item selected from a+b+c+d+f; one particular embodiment includes at least one item selected from a+b+c+e+f; one particular embodiment includes at least one item selected from a+b+d+e+f; one particular embodiment includes at least one item selected from a+c+d+e+f; one particular embodiment includes at least one item selected from b+c+d+e+f.

The packaging may for example be cardboard packaging. The packaging may comprise printed information indicating that the wound dressing is selectively configurable for use in a pressure gradient wound therapy system and without a pressure gradient wound therapy system. The packaging may be sterile; and/or at least part of the packaging, or a sub-package may be sterile.

The instructions instructing a user as to how to configure the wound dressing for use in a pressure gradient wound therapy system and for use without a pressure gradient wound therapy system may be printed on packaging. The instructions instructing a user as to how to configure the wound dressing for use in a pressure gradient wound therapy system and for use without a pressure gradient wound therapy system may be provided on an instruction sheet (which where the kit includes features a+b may be provided in the packaging).

The piercing tool configured to pierce a covering layer of the wound dressing to produce an aperture therein and thereby configure the wound dressing for use in a pressure gradient wound therapy system may comprise a blade. The piercing tool configured to pierce a covering layer of the wound dressing to produce an aperture therein and thereby configure the wound dressing for use in a pressure gradient wound therapy system may be a scalpel.

The source of non-atmospheric pressure preferably a source of negative pressure. Alternatively it may be a source of positive pressure. The source of non-atmospheric pressure may be a pump.

The port for connection to the covering layer of the wound dressing to connect the wound dressing to a source of non-atmospheric pressure may be provided with an airway. The airway may be a transparent passageway securable to the outside of the cover layer at the proximal end of the conduit so as to surround the aperture in the cover layer from above. The port/airway may comprise a connector, at its distal end, for connecting the dressing to a source of pressure (either positive or negative), for example a pump. Preferably the connector is a luer lock to facilitate secure connection to the pump and to maintain the pressure within the wound dressing while the pump is temporarily disconnected. The connector preferably comprises a one-way lock to assist in the maintenance of the applied pressure. To resist collapse, the airway may comprise an internal cylinder of nylon fibres to maintain openness of the airway to fluid.

The tubing for connection between a wound dressing and a source of non-atmospheric pressure may be transparent tubing. The tubing may be flexible. The tubing may be resilient. The tubing may be formed from a resilient flexible plastics material.

According to another aspect of the invention there is provided a pressure gradient wound therapy apparatus, comprising the kit of any preceding aspect of the invention.

In embodiments, the wound therapy apparatus comprises a negative pressure wound therapy apparatus. In other embodiments, the wound therapy apparatus comprises a positive pressure wound therapy apparatus.

In embodiments, the apparatus may comprise a canister and the wound dressing may be fluidly connected to the canister into which exudate removed from the wound may be withdrawn. In preferred embodiments, the wound dressing may be formed of a hydrocolloid material which may gel in the presence of an exudate and the apparatus may include no canister. This may be referred to as a "canister-less" system.

The pump assembly may be fluidly connected to an interior region of the wound dressing, for introducing and/or removing gas from within the wound dressing to control the pressure therein.

According to a further broad aspect of the invention there is provided a method of configuring a selectively configurable wound dressing, the wound dressing being configurable for use in a pressure gradient wound therapy system and without a pressure gradient wound therapy system; the method comprising configuring the wound dressing for use with a pressure gradient wound therapy system by cutting an aperture in the wound dressing.

The wound dressing may comprise a covering layer, which may comprise an indicia; the indicia may denote a position (for example the optimal position) in the covering layer to create an aperture to provide fluid communication between the pressure distribution layer and a source of non-atmospheric pressure; and the method may comprise cutting an aperture in the covering layer in the region of the indicia.

According to an aspect of the invention there is provided a method of configuring a selectively configurable wound dressing, the wound dressing being configurable for use in a pressure gradient wound therapy system and without a pressure gradient wound therapy system; the wound dressing comprising a covering layer, the wound dressing comprising an indicia visible on an outside surface of the covering layer denoting a suitable position (preferably an optimal position) in the covering layer to create an aperture to provide fluid communication between the pressure distribution layer and a source of non-atmospheric pressure; the method comprising configuring the wound dressing for use with a pressure gradient wound therapy system by cutting an aperture in the covering layer of the wound dressing in the region of the indicia.

Of course, the wound dressing of the method aspects may be the wound dressing of the aspects of the wound dressing outlined above, or the wound dressing of the kit. And again, of course the wound dressing may comprise any optional feature described above. For example, the wound dressing may comprise a pressure distribution layer, in which case the method may comprise not cutting into the pressure distribution layer, or cutting into but not cutting through the pressure distribution layer. Similarly, the wound dressing may comprise a wound contact layer and the method may comprise not cutting into the wound contact layer, or cutting into, but not cutting through the wound contact layer. The wound dressing may comprise a pressure distribution layer and a wound contact layer and the method may comprise cutting through the covering layer, cutting into, but not through, the pressure distribution layer, and not cutting into the wound contact layer.

The wound dressing may comprise a release layer and the method may comprise cutting the aperture, then removing the release layer, then applying the dressing to a wound.

The method may be a method of re-purposing a wound dressing that is provided on a wound and configured for use without a pressure gradient wound therapy system; the method comprising cutting an aperture in the wound dressing (in-situ) in order to configure the wound dressing for use with a pressure gradient wound therapy system.

The method may comprise attaching a non-atmospheric pressure source to the wound dressing after configuring the wound dressing for use with a pressure gradient wound therapy system.

DETAILED DESCRIPTION OF THE INVENTION

In order that the invention may be more clearly understood one or more embodiments thereof will now be described, by way of example only, with reference to the accompanying drawings, of which:

Figure 1:
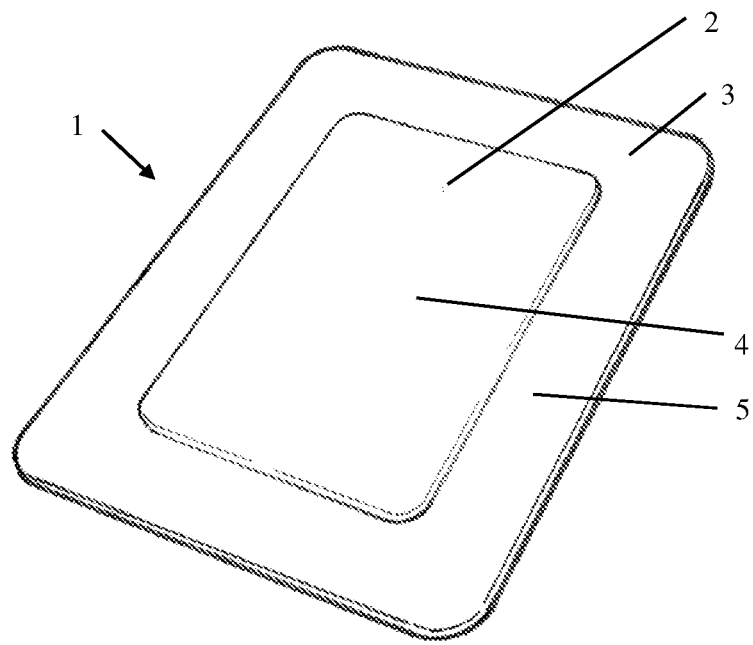
FIG. 1 is a schematic representation of an embodiment of a wound dressing configured for use without a wound therapy apparatus.

Embodiments disclosed herein relate to apparatus and methods of treating a wound both with and without reduced or positive pressure (typically negative pressure). Some embodiments including pump and wound dressing component. The wound dressings discussed are "one-piece" dressings incorporating both a covering layer and an absorbent body.

As disclosed herein the present invention may comprise a wound dressing; or a kit comprising the wound dressing and other apparatus for providing pressure gradient wound therapy to a wound.

As used herein the expression "wound" may include an injury to living tissue may be caused by a cut, blow, or other impact, typically one in which the skin is cut or broken. A wound may be a chronic or acute injury. Acute wounds occur as a result of surgery or trauma. They move through the stages of healing within a predicted timeframe. Chronic wounds typically begin as acute wounds. The acute wound can become a chronic wound when it does not follow the healing stages resulting in a lengthened recovery. It is believed that the transition from acute to chronic wound can be due to a patient being immuno compromised.

Chronic wounds may include for example: venous ulcers (such as those that occur in the legs), which account for the majority of chronic wounds and mostly affect the elderly, diabetic ulcers (for example, foot or ankle ulcers), peripheral arterial disease, pressure ulcers, or epidermolysis bullosa (EB).

Examples of other wounds include, but are not limited to, abdominal wounds or other large or incisional wounds (either as a result of surgery, trauma, stemiotomies, fasciotomies, or other conditions), dehisced wounds, acute wounds, chronic wounds, subacute and dehisced wounds, traumatic wounds (such as from orthopaedic trauma), flaps and skin grafts, lacerations, abrasions, contusions, burns, diabetic ulcers, pressure ulcers, stoma, surgical wounds, trauma and venous ulcers, broken bones or the like.

Wounds may also include a deep tissue injury. Deep tissue injury is a term proposed by the National Pressure Ulcer Advisory Panel (NPUAP) to describe a unique form of pressure ulcers. These ulcers have been described by clinicians for many years with terms such as purple pressure ulcers, ulcers that are likely to deteriorate and bruises on bony prominences.

The technology disclosed can be used on an acute or chronic wound.

Wounds are believed to be more susceptible to infection under the following circumstances. If the wounds are chronic wounds, or if an object which caused the wound was dirty or contained bacteria, or from a bite, or contains remnant or a whole object that caused the wound, or a wound that is large or deep, or jagged edges to the wound, or elderly, or chronic because by their nature a wound site is open; and/or if the patient has: diabetes type 1 or type 2, is elderly, or has a compromised immune system.

Pressure gradient wound therapy may also be useful for treating second- and third-degree burns, as well as being useful for laparotomy surgery i.e., a large incision through an abdominal wall to gain access into the abdominal cavity.

Figure 2:
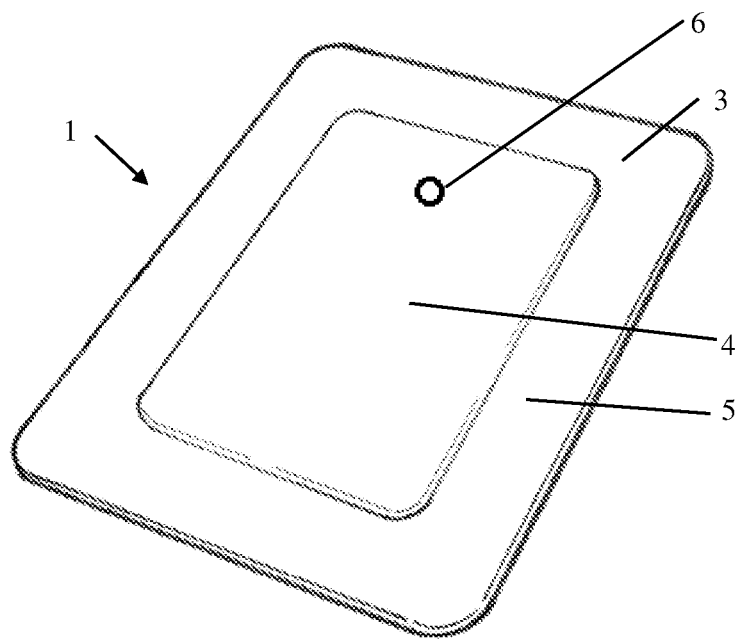
FIG. 2 is a schematic representation of the wound dressing of FIG. 1 configured for use with a wound therapy apparatus.

FIGS. 1 and 2 illustrates an embodiment of a wound dressing 1 in accordance with the invention in two different configurations.

In general, the invention relates to a wound dressing 1, which is selectively configurable for use without a pressure gradient wound therapy system or for use with a pressure gradient wound therapy system, e.g. negative pressure wound therapy.

As shown in FIG. 1, the wound dressing 1 includes an indicia 2 visible on the upper (outside) surface of a covering layer 3 of the dressing 1. The covering layer 3 has a raised central region 4, where it overlies a dressing body, which can include a pressure dispersion layer; an absorbent/superabsorbent layer/layers; and a wound-contact layer. The dressing 1 also has a border region 5, where it overlies an adhesive layer. A removable release layer (not shown) is provided on the underside.

The indicia 2 indicates where the dressing should be cut to form an aperture in order to configure the dressing for use with a pressure gradient wound therapy system; the dressing being configured for use without a pressure gradient wound therapy system unless/until an aperture is cut in the covering layer. In this embodiment, the indicia 2 is shown as a circle formed in dashed lines, arranged in the optimal position for connection of a source of non-atmospheric pressure. Obviously in other embodiments alternative shapes/signs could be used and of course the indicia need not be in dashed lines.

As illustrated in FIG. 1, the wound dressing is configured for use without a pressure gradient wound therapy system. To use the wound dressing 1 without a pressure gradient wound therapy system, the release layer is simply removed and the dressing applied in the same way as an ordinary wound dressing. It will be noted that the entire raised central region 4 of the covering layer 3 is a continuous unbroken membrane, uninterrupted and closed, so that the wound (within the region defined by the adhesive border) is in a sealed environment, restricting/preventing bacteria/microbes entering the wound and causing infection.

FIG. 2 shows the wound dressing 1 of FIG. 1 configured for use with a pressure gradient wound therapy system. Here, a user has cut through the cover layer 3 using a bladed instrument, such as a scalpel, in the region of the indicia 2, to form an aperture 6 in the wound dressing 1 (so that the central region 4 is no longer closed/uninterrupted). With the wound dressing 1 now configured for use with a pressure gradient therapy system, a source of non-atmospheric, e.g. negative, pressure can be connected to the aperture 6 to aid the wound-healing process.

For example, a port (not shown in FIG. 1 or 2) can be adhered to the wound dressing 1, such that a conduit through the port is aligned with the aperture 6; the port can be connected via tubing (also not shown in FIGS. 1 and 2) to a pump (also not shown in FIGS. 1 and 2) producing negative pressure.

Figure 3:
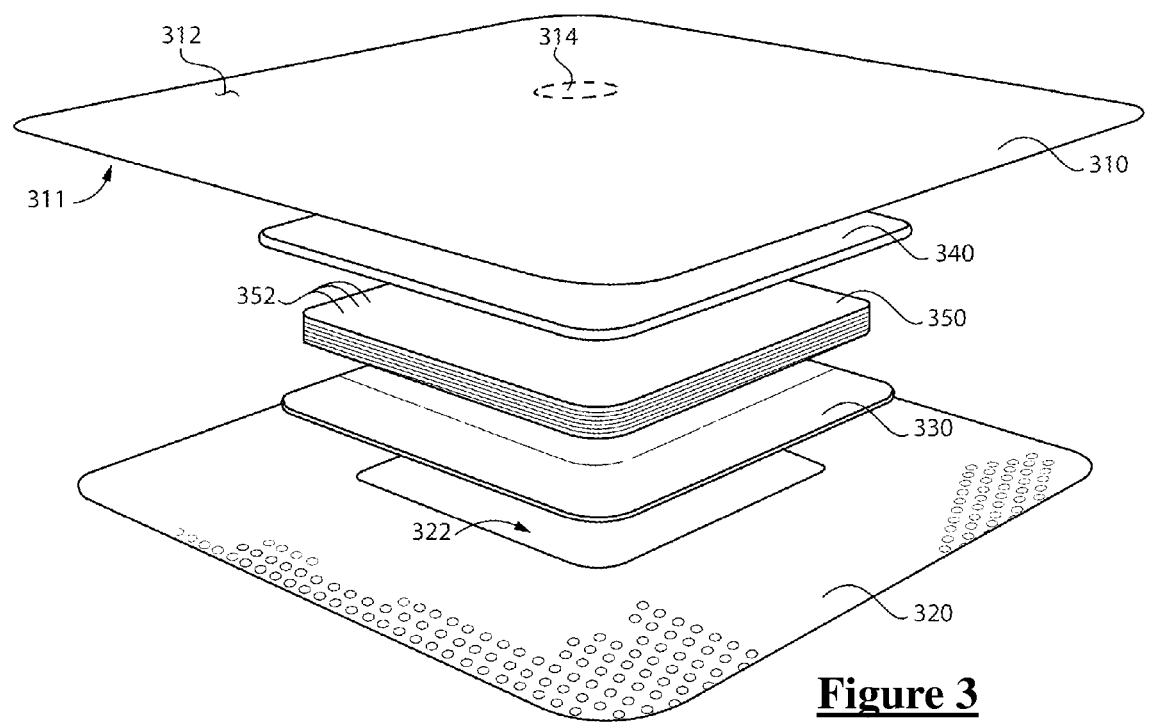
FIG. 3 is an exploded view of another embodiment of a wound dressing configured for use without a wound therapy apparatus.
Figure 4:
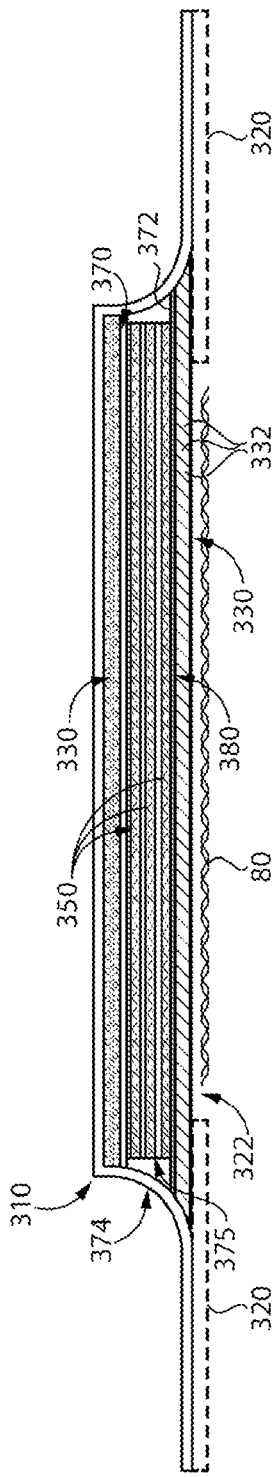
FIG. 4 is a cross-sectional view of the wound dressing illustrated in FIG. 3.

With additional reference to FIGS. 3-4, illustrated therein is a schematic of another exemplary wound dressing 300.

The illustrated wound dressing 300 generally includes a covering layer 310 and an adhesive layer 320 for adhering the wound dressing 300 adjacent the wound. In certain embodiments, the wound dressing 300 further comprises a wound contact layer 330 for contacting the wound, a pressure dispersion layer 340, a plurality of absorbent material layers 350 disposed between the wound contact layer 330 and the pressure dispersion layer 340.

The covering layer 310 has a first surface 311 and a second surface 312, and the first surface 311 is adjacent, and in contact with, the pressure dispersion layer 340 and the adhesive layer 320. The covering layer 310 defines a cavity in which the pressure dispersion layer 340 is arranged. In certain embodiments, the covering layer 310 is formed of a polyurethane film. The covering layer 310 comprises indicia 314 again in the form of a dashed circle, arranged in the optimal position for connection to a source of negative pressure.

The polyurethane film is transparent, so the indicia can be printed on the inside first surface 311 or the outside, second, surface 312 of the film layer 310. In another embodiment it is printed on the layer beneath the transparent covering layer 310, so as to be visible on the outside second surface 312.

The adhesive layer 320 generally defines a border about an opening 322 for receiving the wound. In certain embodiments, the adhesive layer 320 comprises a silicone adhesive. In certain embodiments, the adhesive layer 320 may be perforated.

The wound contact layer 330 overlaps the border defined by the adhesive layer 320, and is configured to contact the wound via the opening 322. In certain embodiments, the wound contact layer 330 may comprise Medicel™. In certain embodiments, the wound contact layer 330 comprises carboxymethylated cellulose fibers. In certain embodiments, the wound contact layer 330 may comprise HYDROFIBER®. In certain embodiments, the wound contact layer 330 may be reinforced, for example via nylon stitching. Thus, the wound contact layer 330 may comprise reinforcing nylon stitching 332.

The pressure dispersion layer 340 is adjacent and in contact with the first surface 311 of the cover layer 310. In certain embodiments, the pressure dispersion layer 340 may be provided as a polyester foam layer. In certain embodiments, the pressure dispersion layer 340 comprises reticulated foam.

The absorbent material layers 350 are positioned between the wound contact layer 330 and the pressure dispersion layer 340. The wound dressing 300 may, for example, comprise eight absorbent material layers 350. In certain embodiments, one or more of the absorbent material layers 350 may comprise carboxymethylated cellulose fibers. In certain embodiments, one or more of the absorbent material layers 350 may comprise Medicel™. In certain embodiments, one or more of the absorbent material layers 350 may comprise HYDROFIBER®. In certain embodiments, one or more of the absorbent material layers 350 further comprises fenestrations 352.

Figure 5:
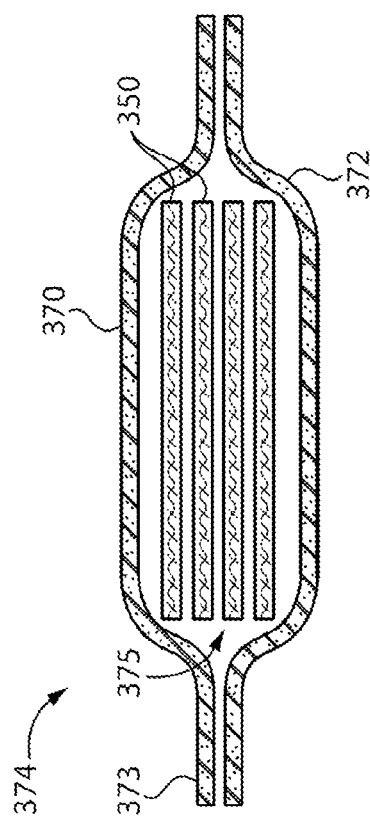
FIG. 5 is a cross-sectional view of a portion of the wound dressing illustrated in FIG. 3.

In certain embodiments, as shown in FIG. 4, the wound dressing 300 may include an additional layer 370 between the pressure dispersion layer 330 and the uppermost absorbent layer 350. The additional layer 370 may, for example, be formed of thermoplastic. In certain embodiments, the additional layer 370 may be provided as a thermoplastic spun lace layer. In certain embodiments, the wound dressing 300 may further comprise a nonwoven spun lace layer 372 connected to the wound contact layer 330. In certain embodiments, an envelope structure 374 is formed by joining peripheral portions 373 of the thermoplastic spun lace layer 370 and the nonwoven spun lace layer 372 such that the plurality of absorbent material layers 350 are disposed substantially within an interior cavity 375 of the envelope structure 374, for example as illustrated in FIG. 5. In certain embodiments, the absorbent material layers 350 are disposed within the interior cavity 375 of the envelope structure 374.

In certain embodiments, the wound dressing 300 may include a further layer 380 positioned between the wound contact layer 330 and the lowermost absorbent layer 350. The further layer 380 may, for example, be a polyester/viscose layer.

As is well known, and therefore not shown, the wound dressing 300 may be provided with a removable release layer on the underside, covering the adhesive layer 320 and the underside of the wound contact layer 330; and it may be individually packaged within a sterile package.

As illustrated in FIGS. 3-5, the wound dressing is configured for use without a pressure gradient wound therapy system. To use the wound dressing 300 without a pressure gradient wound therapy system, it is simply removed from its sterile packaging, then the release layer is simply removed and the dressing applied in the same way as an ordinary wound dressing. Again, it will be noted that in this configuration the entire region of the covering layer 310 within the peripheral adhesive border defined by the layer 320 is uninterrupted and closed, sealing the wound against microbes/bacteria that could cause infection.

Figure 6:
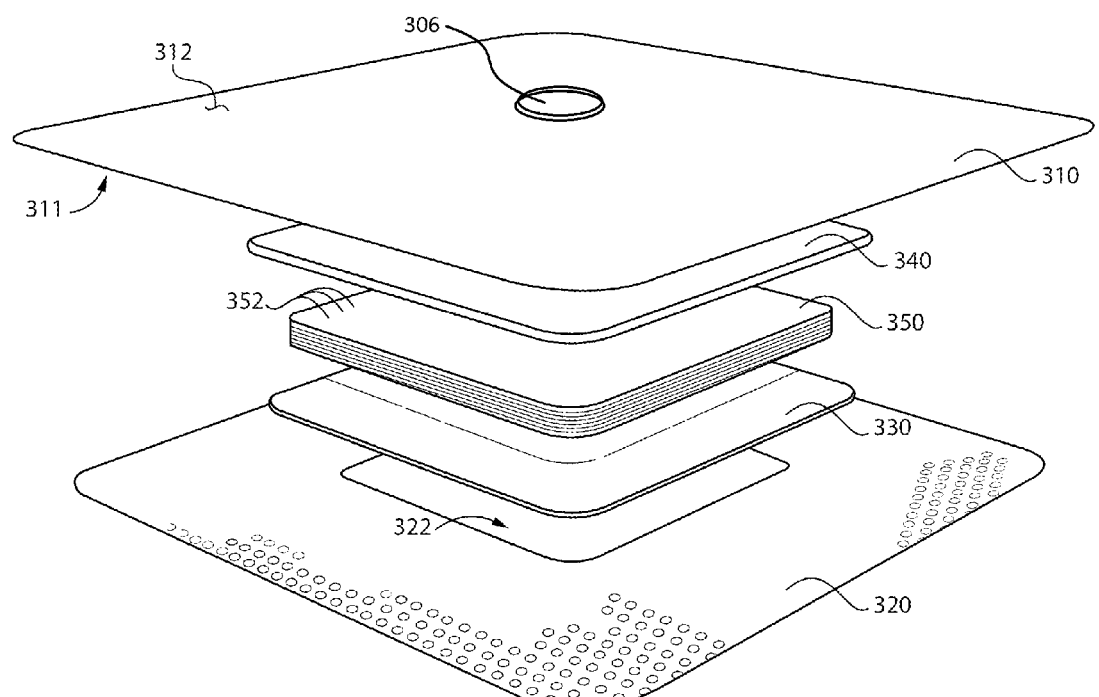
FIG. 6 is an exploded view of the embodiment of the wound dressing of FIG. 3 configured for use with a pressure gradient wound therapy apparatus
Figure 7:
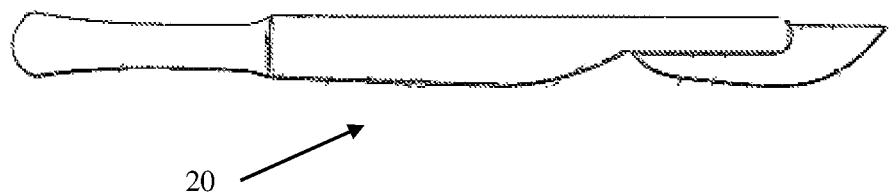
FIG. 7 is a side view of a piercing tool.

FIG. 6 shows the wound dressing 1 of FIGS. 3-5 configured for use with a pressure gradient wound therapy system. Here, a user has cut through the cover layer 310 using a bladed instrument, such as the scalpel shown in FIG. 7, in the region of the indicia 314, to form an aperture 306 in the wound dressing 300. As such, the region of the covering layer 310 within the peripheral adhesive border defined by the layer 320 is now interrupted by the aperture 306, which forms an opening.

Figure 8:
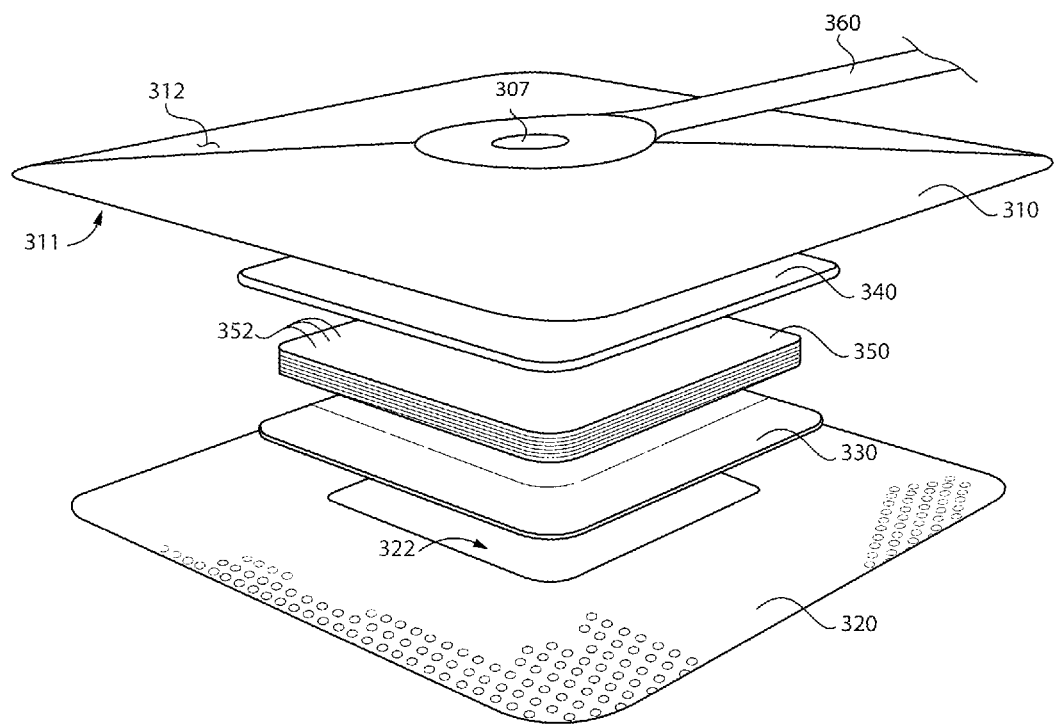
FIG. 8 is an exploded view of the wound dressing of FIG. 6 in use with a pressure gradient wound therapy apparatus.
Figure 9:
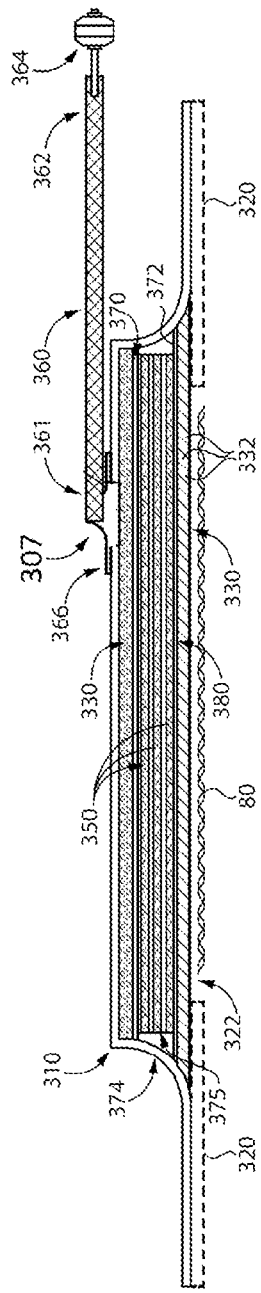
FIG. 9 is a cross-sectional view of the wound dressing of FIG. 4 in use with a pressure gradient wound therapy apparatus.

Next, and as shown in FIGS. 8 and 9, a port 307 is adhered to the outside, second surface 312 of the cover layer 310. An adhesive ring 366 attaches the port 307 to form a seal between one end 361 of the tube 360 and the port 307. The opposite end 362 of the tube 360 may be connected with a fitting such as a Luer lock 364.

Figure 10:
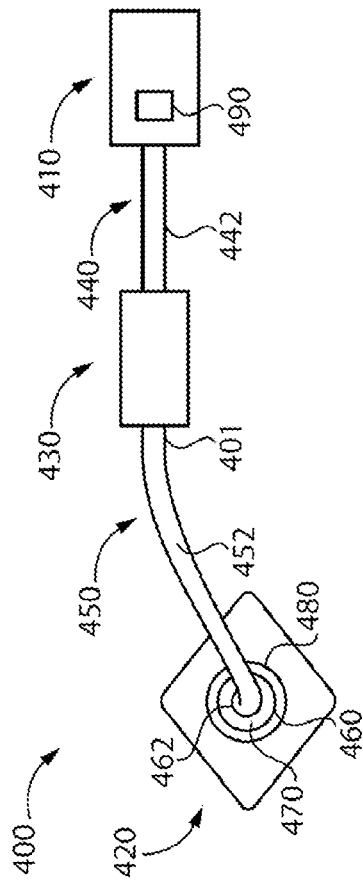
FIG. 10 is a schematic representation of a wound exudate management system according to certain embodiments.

With additional reference to FIG. 10, illustrated therein is a pressure gradient wound therapy system 400 according to certain embodiments. The pressure gradient wound therapy system 400 comprises a pump 410 for generating negative pressure, a wound dressing 420 (which may be the wound dressing 1 or 300 described above) for covering and protecting a wound, an inline filter 430, a first pressure tube 440 having a first interior lumen 442, a second pressure tube 450 having a second interior lumen 452, and a flexible connector 460. The first pressure tube 440 is disposed between the pump 410 and the inline filter 430. The second pressure tube 450 is disposed between the inline filter 430 and the flexible connector 460. The flexible connector 460 is disposed between the second pressure tube 450 and the wound dressing 420 such that the pump 410 and the wound dressing 420 are in fluid communication via the interior lumens 442, 452.

Figure 11:
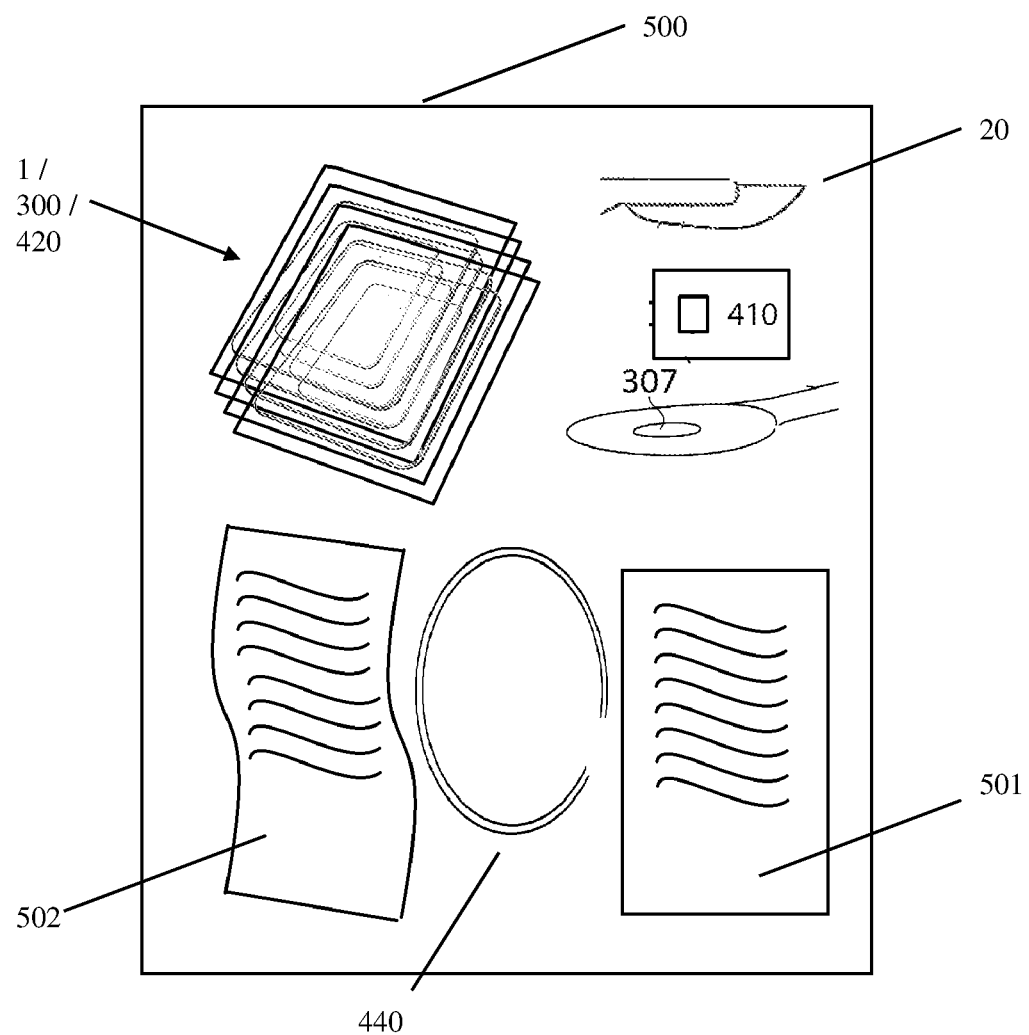
FIG. 11 is a schematic representation of a kit of parts.

The wound dressings 1, 300, 420 may be provided in kits. As illustrated schematically in FIG. 11, the kits can comprise one or preferably more than one of the selectively configurable wound dressings 1, 300, 420 and at least one of the following items, all of which are included in this exemplary kit:

(a) packaging 500 indicating that the wound dressing is selectively configurable for use in a pressure gradient wound therapy system and without a pressure gradient wound therapy system. In this example the packaging is a cardboard box, printed with instructions 501 for use.
(b) instructions instructing a user as to how to configure the wound dressing for use in a pressure gradient wound therapy system and for use without a pressure gradient wound therapy system. In this example, the instructions are printed on a leaflet 502 included in the box.
(c) a piercing tool configured to pierce a covering layer of the wound dressing to produce an aperture therein and thereby configure the wound dressing for use in a pressure gradient wound therapy system. In this embodiment, the piercing tool takes the form of the scalpel 20.
(d) a source of non-atmospheric pressure. In this embodiment, the source of non-atmospheric pressure is the pump 410.
(e) a port for connection to the covering layer of the wound dressing to connect the wound dressing to a source of non-atmospheric pressure. In this embodiment the port is the port 307 described above.
(f) tubing for connection between a wound dressing and a source of non-atmospheric pressure. In this embodiment tubing 440 described above is included.

For use where it is envisioned that a wound will initially require treatment with a pressure gradient wound therapy system, the kit may comprise one or more preferably a plurality of, dressings 1/300/420 and one or more of items c, d, e and f, for example all of items c, d, e and f, and optionally items a and/or b as well. As such, the user can be provided with all the equipment required to use the wound dressings 1/300/420 with a pressure gradient wound therapy system.

In order to use such a kit, the user (e.g. a patient or HCP) can cut an aperture in a dressing 1/30/420 in the region of the indicia, optionally using the piercing tool 20; attach a port 307 thereto, around the aperture, and in fluid communication therewith; attach one end of the tubing 440 to the port 307 and the other to the pump 410 and run the pump 440 to provide non-atmospheric (e.g. negative) pressure to the wound.

Then, if/when the pressure gradient therapy is no longer necessary, the user can use up any remaining wound dressings 1/300/420 without the pressure gradient wound therapy system, by applying them to the wound without cutting an aperture in the dressings 1/300/420 in the region of the indicia, so as to maintain a sealed environment around the wound.

On the other hand, for use where it is envisioned that a wound does not require treatment with a pressure gradient wound therapy system (and most preferably where it is envisioned that a wound does not require treatment with a pressure gradient wound therapy system, but it is considered that there is a risk that the wound will not heal well without a pressure gradient so in future, pressure gradient wound therapy might be useful), the kit may comprise one, or more preferably a plurality of selectively configurable dressings 1/300/420 and one or both of items a and b. As such, the user has instructions on how to use the dressings without a pressure gradient wound therapy system and can simply apply a dressing 1/300/420 to the wound in the configuration for use without a pressure gradient wound therapy system. Thus the user can follow the instructions by removing the release layer and applying the dressing to the wound without cutting an aperture in the region of the indicia 2, 314, so that the cover layer is uninterrupted and closed within the adhesive border, and the is wound sealed against bacteria/microbes.

Then, should it be determined that the wound would benefit from pressure gradient therapy (e.g. negative pressure), the user can follow the instructions from the packaging/instructions, to cut a hole in the covering layer 3/310 in the region of the indicia 2/314 and apply a pressure gradient wound therapy system as outlined above (sourced for example from another kit), without having to first remove the dressing 1/300/420 (which can present an opportunity for infection).

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Each of the documents referred to above is incorporated herein by reference. Except in Examples, or where otherwise explicitly indicated, all numerical quantities in this description specifying amounts of materials, device dimension, and the like, are to be understood as modified by the word "about."

Unless otherwise indicated, each chemical or composition referred to herein should be interpreted as being a commercial grade material which may contain the isomers, by-products, derivatives, and other such materials which are normally understood to be present in the commercial grade.

The one or more embodiments are described above by way of example only. Many variations are possible without departing from the scope of protection afforded by the appended claims.

The invention claimed is:

1. A one-piece wound dressing selectively configurable for use in a pressure gradient wound therapy system and for use without a pressure gradient wound therapy system, the wound dressing comprising:
    a wound contact layer;
    a plurality of absorbent layers;
    a pressure distribution layer;
    a covering layer comprising
        a first surface defining a wound dressing cavity containing the pressure distribution layer, the plurality of absorbent layers, and the wound contact layer, and
        a second surface; and
    an indica visible on the second surface of the covering layer denoting the optimal position in the covering layer to cut an aperture through the covering layer but not through the pressure distribution layer and the wound contact layer to provide fluid communication between the cavity and a source of non-atmospheric pressure,
    wherein the indicia is printed onto the second surface of the covering layer,
    wherein the covering layer, the pressure distribution layer, the plurality of absorbent layers, and the wound contact layer are formed as an integral item, and
    wherein in the configuration for use without a pressure gradient wound therapy system the covering layer is uninterrupted, and in the configuration for use with a pressure gradient wound therapy system the covering layer is interrupted by the aperture in the region of the indicia and the aperture does not extend into or through the pressure distribution layer and the wound contact layer.

2. The wound dressing according to claim 1 wherein the indicia is a mark.

3. The wound dressing according to claim 2 wherein the mark is formed of ink or dye.

4. The wound dressing according to claim 2 wherein the mark is formed by discoloration.

5. The wound dressing according to claim 4 wherein the indicia is laser marked.

6. The wound dressing according to claim 1 wherein the indicia is located out of alignment with the centre of the dressing.

7. The wound dressing according to claim 1, wherein the pressure distribution layer is provided adjacent to the covering layer, is gas and liquid permeable and moisture vapour permeable; wherein an adhesive layer is provided so as to form an adhesive border; wherein the indicia is located in a region of the covering layer within that defined by the adhesive border and located towards the periphery of the region of the covering layer inwards of the adhesive border; and comprising a release layer, the release layer being removable to reveal the adhesive border.

8. The wound dressing according to claim 7, wherein in the configuration for use without a pressure gradient wound therapy system the region of the covering layer within that defined by the adhesive border is uninterrupted; and in the configuration for use with a pressure gradient wound therapy system the region of the covering layer within the adhesive border is interrupted by the aperture in the region of the indicia and the aperture does not extend into or through the pressure distribution layer and the wound contact layer.

9. A wound dressing according to claim 1 wherein the plurality of absorbent layers include a hydrocolloid material which gels in the presence of an exudate.

10. A wound dressing according to claim 1 wherein the wound contact layer comprises a silicone gel.

11. A wound dressing according to claim 1 wherein the plurality of absorbent layers comprise an absorbent material comprising gel forming fibres, spun sodium carboxymethylcellulose fibres, chemically modified cellulosic fibres, alkyl sulphonate modified cellulosic fibres, pectin fibres, alginate fibres, chitosan fibres, hyaluronic acid fibres, or other polysaccharide fibres or fibres derived from gums.

12. A wound dressing according to claim 11, wherein the plurality of absorbent layer(s) comprise fenestrations to aid the application of negative pressure to the wound and maintain the pathway for fluid from the wound, through the internal absorbent layer and the wound contact layer comprises gel-forming fibres.

13. A wound dressing according to claim 1 wherein the one-piece dressing is provided in a sterile package.

14. A kit of parts including a selectively configurable wound dressing according claim 1 and at least one of:
    a. packaging indicating that the wound dressing is selectively configurable for use in a pressure gradient wound therapy system and without a pressure gradient wound therapy system;

b. instructions instructing a user as to how to configure the wound dressing for use in a pressure gradient wound therapy system and for use without a pressure gradient wound therapy system;
c. a piercing tool configured to pierce the covering layer of the wound dressing to produce the aperture therein and thereby configured the wound dressing for use in a pressure gradient wound therapy system;
d. the source of non-atmospheric pressure;
e. a port for connection to the covering layer of the wound dressing to connect the wound dressing to the source of non-atmospheric pressure; or
f. tubing for connection between the wound dressing and the source of non-atmospheric pressure.

15. A kit of parts including a selectively configurable one-piece wound dressing, the wound dressing being configurable for use in a pressure gradient wound therapy system and without a pressure gradient wound therapy system; the kit further comprising at least one of:
a. packaging indicating that the wound dressing is selectively configurable for use in a pressure gradient wound therapy system and without a pressure gradient wound therapy system;
b. instructions instructing a user as to how to configure the wound dressing for use in a pressure gradient wound therapy system and for use without a pressure gradient wound therapy system;
c. a piercing tool configured to pierce a covering layer of the wound dressing to produce an aperture therein and thereby configure the wound dressing for use in a pressure gradient wound therapy system;
d. a source of non-atmospheric pressure;
e. a port for connection to the covering layer of the wound dressing to connect the wound dressing to the source of non-atmospheric pressure; and
f. tubing for connection between the wound dressing and the source of non-atmospheric pressure;
wherein the wound dressing comprises a wound contact layer, a plurality of absorbent layers, a pressure distribution layer, and the covering layer, the covering layer having a first surface facing the wound contact layer and defining a wound dressing cavity, and a second surface,
wherein an indicia is visible on the second surface of the covering layer, the indica denoting a suitable position in the covering layer to cut an aperture through the covering layer but not through the pressure distribution layer and the wound contact layer to provide fluid communication between the wound dressing cavity and the source of non-atmospheric pressure,
wherein the indicia is printed onto the covering layer and the wound dressing is a one-piece dressing in which the covering layer, the pressure distribution layer, the plurality of absorbent layers, and the wound contact layer are formed as an integral item, and
wherein in the configuration for use without a pressure gradient wound therapy system the covering layer is uninterrupted, and in the configuration for use with a pressure gradient wound therapy system the covering layer is interrupted by the aperture in the region of the indicia and the aperture does not extend into or through the pressure distribution layer and the wound contact layer.

16. A kit of parts according to claim 15 including at least one item selected from: (a) the packaging indicating that the wound dressing is selectively configurable for use in a pressure gradient wound therapy system and without a pressure gradient wound therapy system; and (b) the instructions instructing a user as to how to configure the wound dressing for use in a pressure gradient wound therapy system and for use without a pressure gradient wound therapy system.

17. A kit of parts according to claim 15 including at least one item selected from (c) the piercing tool configured to pierce the covering layer of the wound dressing to produce an aperture therein and thereby configure the wound dressing for use in a pressure gradient wound therapy system; (d) the source of non-atmospheric pressure; (e) the port for connection to the covering layer of the wound dressing to connect the wound dressing to the source of non-atmospheric pressure; and (f) the tubing for connection between the wound dressing and the source of non-atmospheric pressure.

18. A kit of parts according to claim 15 including (a) packaging in the form of cardboard packaging including printed information indicating that the wound dressing is selectively configurable for use in a pressure gradient wound therapy system and without a pressure gradient wound therapy system; wherein the packaging is sterile; and/or at least part of the packaging, or a sub-package is sterile.

19. A kit of parts according to claim 15 including (b) instructions instructing a user as to how to configure the wound dressing for use in a pressure gradient wound therapy system and for use without a pressure gradient wound therapy system printed on packaging or provided on an instruction sheet.

20. A kit of parts according to claim 15 including (c) a piercing tool configured to pierce the covering layer of the wound dressing to produce an aperture therein and thereby configure the wound dressing for use in a pressure gradient wound therapy system, the piercing tool comprising a scalpel.

21. A kit of parts according to claim 15 including (d) the source of non-atmospheric pressure which is a pump which provides a source of negative pressure.

22. A kit of parts according to claim 15 including (e) the port for connection to the covering layer of the wound dressing to connect the wound dressing to the source of non-atmospheric pressure, the port being provided with an airway in the form of a transparent passageway securable to the outside of the cover layer at the proximal end of a conduit so as to surround the aperture in the covering layer from above and comprising a connector, at its distal end, for connecting the dressing to the source of non-atmospheric pressure.

23. A kit of parts according to claim 15 including (f) tubing for connection between the wound dressing and the source of non-atmospheric pressure may be transparent tubing, the tubing formed from a resilient flexible plastics material.

* * * * *